July 21, 1970

J. J. ADRIAN 3,521,438

STRAWBERRY HARVESTER

Filed March 1, 1968

Joseph J. Adrian
INVENTOR.

BY Clarence A. O'Brien
and Harvey B. Jackson
Attorneys

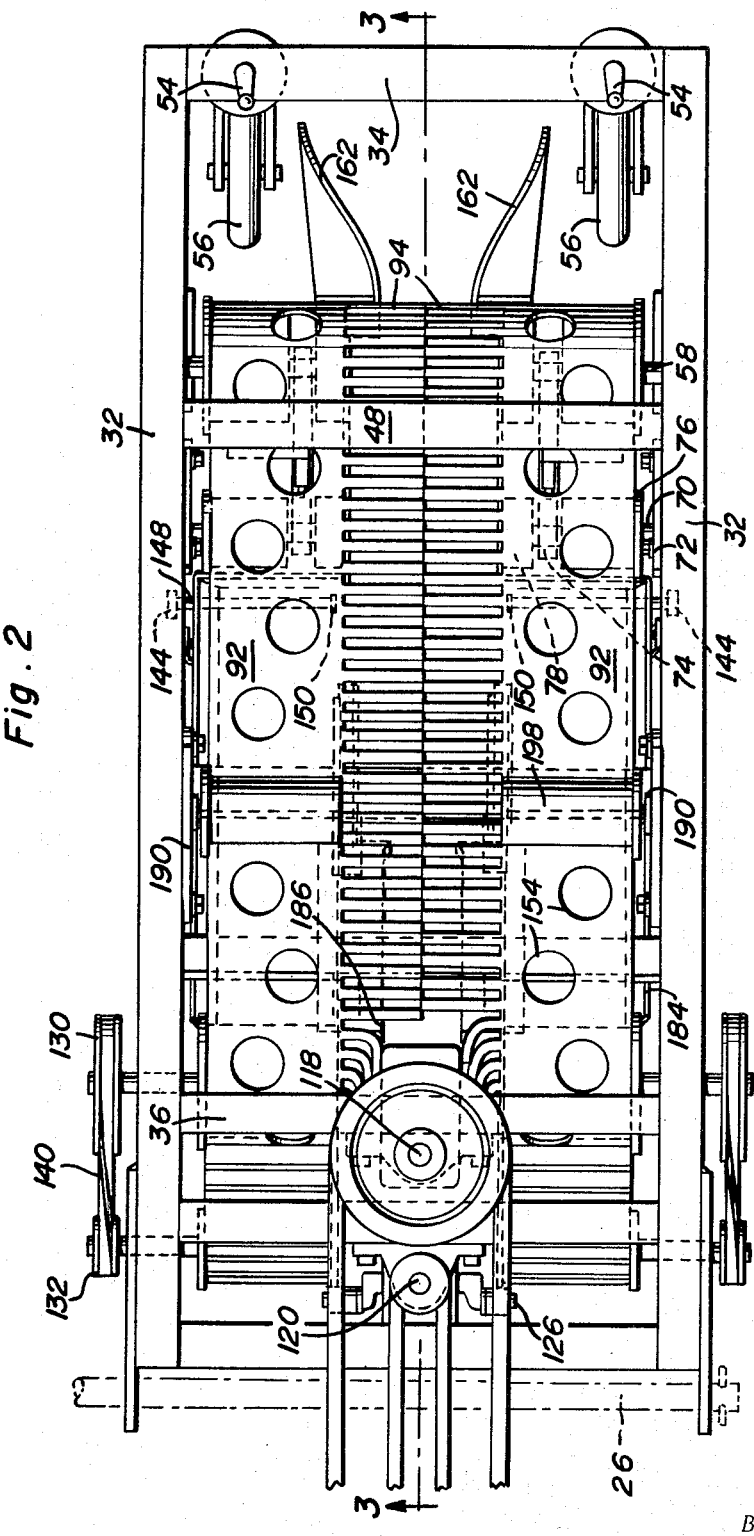
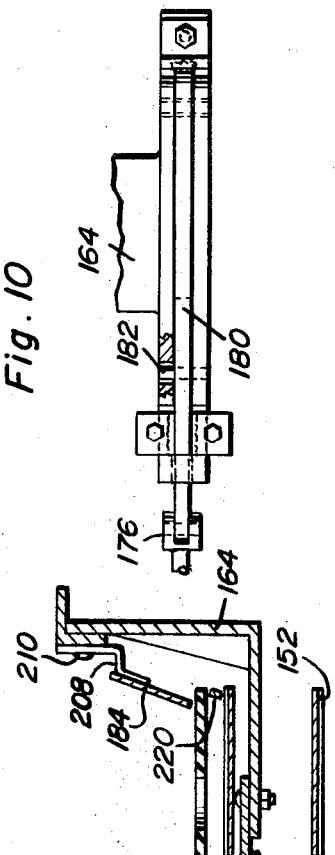
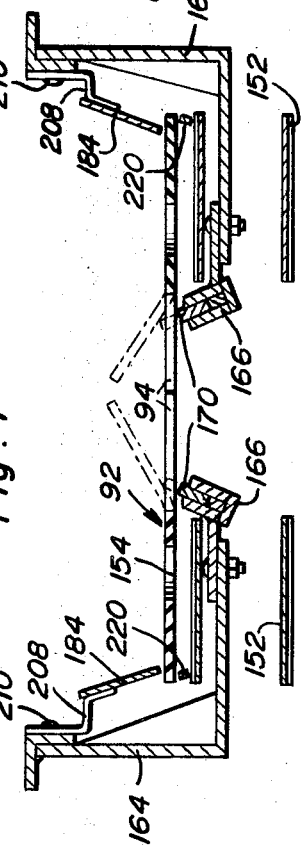
Fig. 2
Fig. 10
Fig. 7
Joseph J. Adrian
INVENTOR.

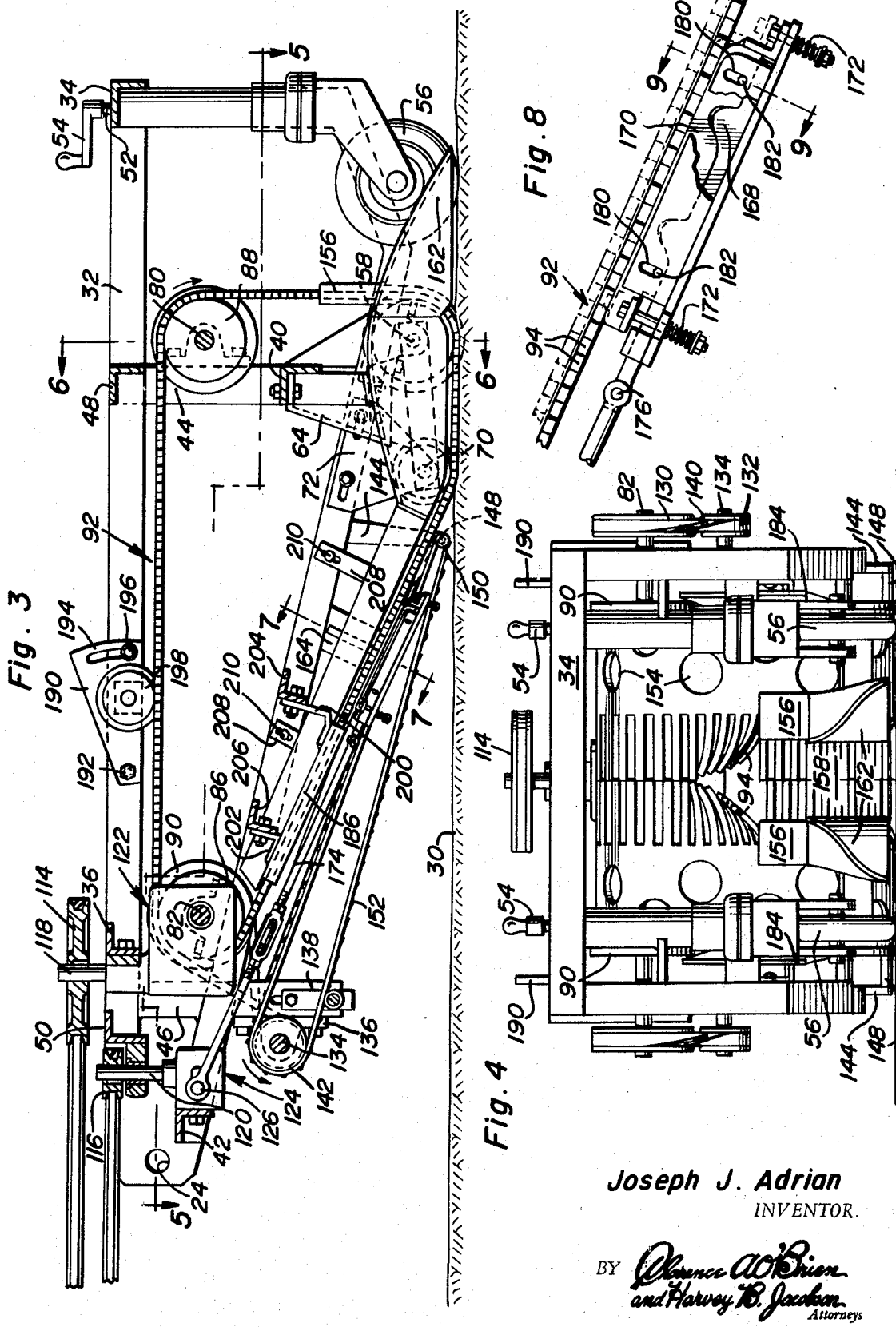

July 21, 1970   J. J. ADRIAN   3,521,438
STRAWBERRY HARVESTER
Filed March 1, 1968   4 Sheets-Sheet 4
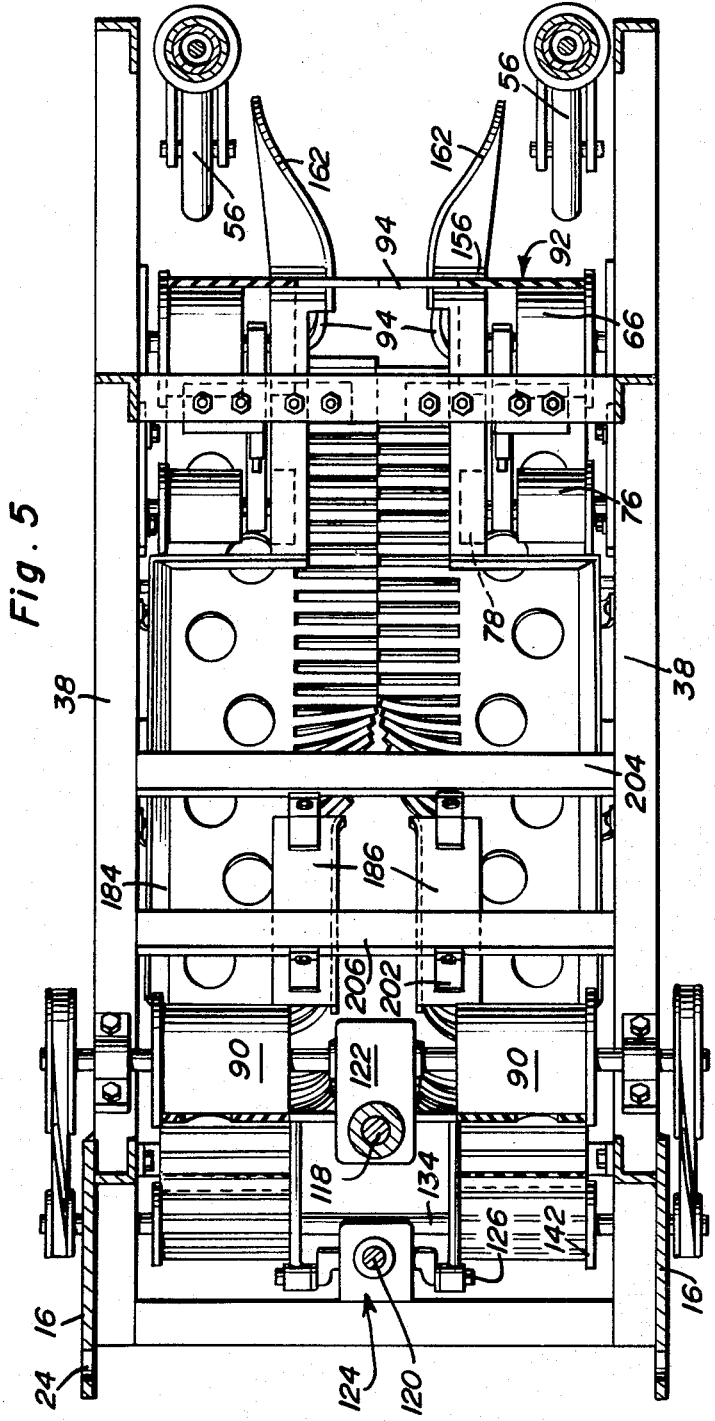
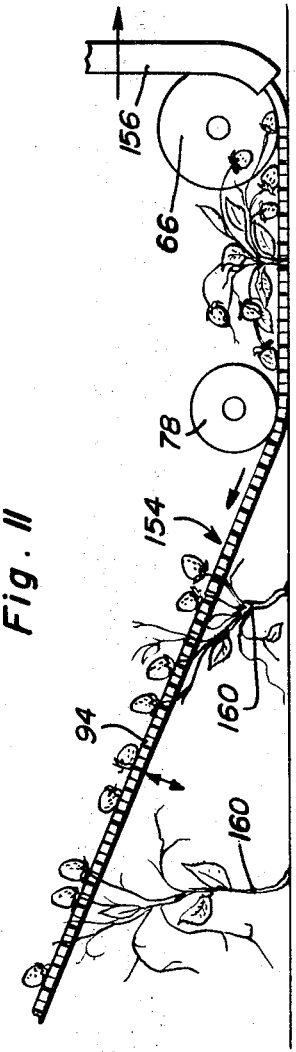
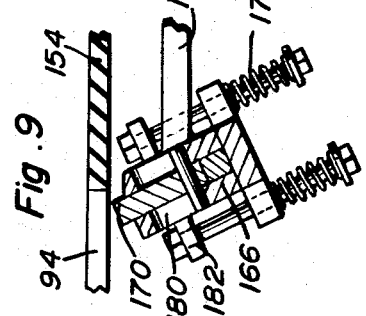
Joseph J. Adrian
INVENTOR.

United States Patent Office 3,521,438
Patented July 21, 1970

3,521,438
STRAWBERRY HARVESTER
Joseph J. Adrian, Northville Township, La Salle County,
Ill. (Somonauk, Ill. 60552)
Filed Mar. 1, 1968, Ser. No. 709,604
Int. Cl. A01g 19/00
U.S. Cl. 56—330                                       15 Claims

ABSTRACT OF THE DISCLOSURE

A frame having front and rear ends and adapted to move along row crops from which berries are to be picked. An endless flexible picker belt is entrained from the frame and includes a downwardly moving forwardly disposed upstanding reach whose lower end terminates in a rearwardly moving lower and generally horizontally disposed reach which in turn terminates at its rear end in a rearwardly and upwardly moving inclined reach. The picker belt includes longitudinally spaced transversely outwardly projecting resilient fingers and the frame includes guide means engaged with the belt, at least in the area of the lower end of the forward upstanding reach of the belt operative to fold the fingers of the belt inwardly relative to the longitudinal center line of the belt and rearwardly relative to the direction of movement of the belt and to thereafter retain the fingers in folded positions until they at least approach the lower limit of movement of the upstanding reach of the belt at which point the fingers are released for swinging outwardly toward their original transversely outwardly projecting positions as they are moved into close proximity with the ground along which the frame is being moved, whereby the released fingers may swing outward over the surface of the ground and beneath the foliage of row crops along which the belt is being moved prior to the fingers moving upwardly through the foliage of the row crops as the belt moves rearwardly and upwardly along the inclined reach thereof during forward movement of the frame at a speed generally equal to the rearward movement of the inclined reach of the belt.

---

The main object of this invention is to provide a harvesting machine which will be capable of efficiently and gently picking strawberries from strawberry plants.

Another object of this invention is to provide a strawberry harvester in accordance with the immediately preceding object including structure embodying a novel crop picking principle which may be utilized to efficiently pick crops other than strawberries.

Yet another object of this invention is to provide a harvesting machine whose mechanical components actually involved in the picking process include few individual moving parts for simplicity of operation and maintenance.

A further object of this invention is to provide a harvesting machine which may be readily propelled and powered by various power sources.

An ancillary object of this invention is to provide a harvesting machine in accordance with the preceding objects constructed in a manner whereby it may be readily custom adjusted for picking individual crops merely, by replacement of only one component (the fingered conveyor belt) thereof.

Another object of this invention is to provide a strawberry picker or harvester which will be capable of picking strawberries without excessively damaging the plants and which will be selective to pick the riper berries while leaving those berries which have not ripened on the plants.

A final object of this invention to be specifically enumerated herein is to provide a strawberry harvester in accordance with the preceding objects which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is an enlarged top plan view of the strawberry harvester;

FIG. 3 is a longitudinal vertical sectional view taken substantially upon the plane indicated by the section line 3—3 of FIG. 2;

FIG. 4 is a front elevational view of the strawberry picker;

FIG. 5 is a horizontal sectional view taken substantially upon the plane indicated by the section line 5—5 of FIG. 3;

FIG. 7 is an enlarged fragmentary transverse sectional view taken substantially upon the plane indicated by the section line 7—7 of FIG. 3 and illustrating alternate positions of the conveyor belt picking fingers in phantom lines;

FIG. 8 is a fragmentary side elevational view of the conveyor belt picking finger oscillating mechanism with alternate positions thereof illustrated in phantom lines;

FIG. 9 is an enlarged fragmentary sectional view taken substantially upon the plane indicated by the section 9—9 of FIG. 8;

FIG. 10 is a plan view of the finger oscillating assembly illustrated in FIGS. 8 and 9; and FIG. 11 is a fragmentary schematic side elevational view illustrating the manner in which the endless berry picking belt may be advanced along a row of strawberry plants in order to pick the ripe strawberries from the plants.

Figure 1:
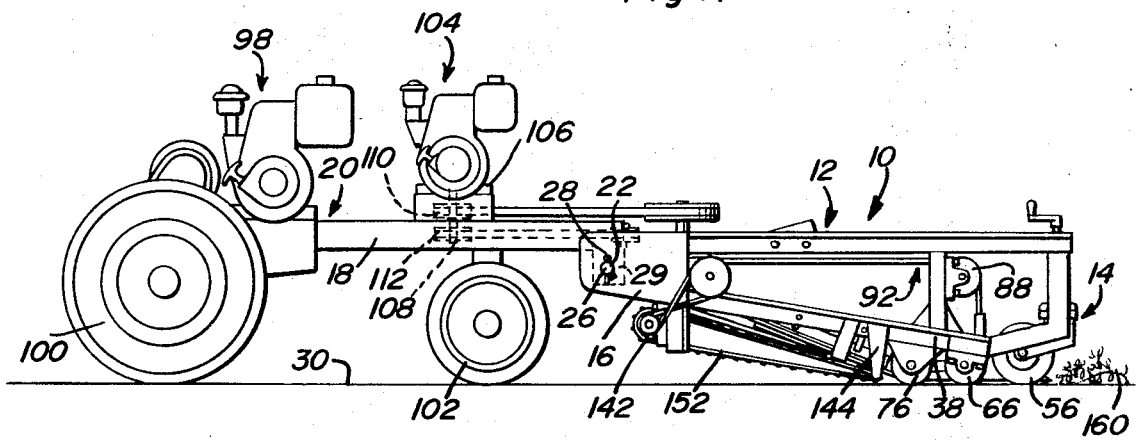
FIG. 1 is a side elevational view of the strawberry picker as propelled and powered by a modified form of garden tractor.
Figure 6:
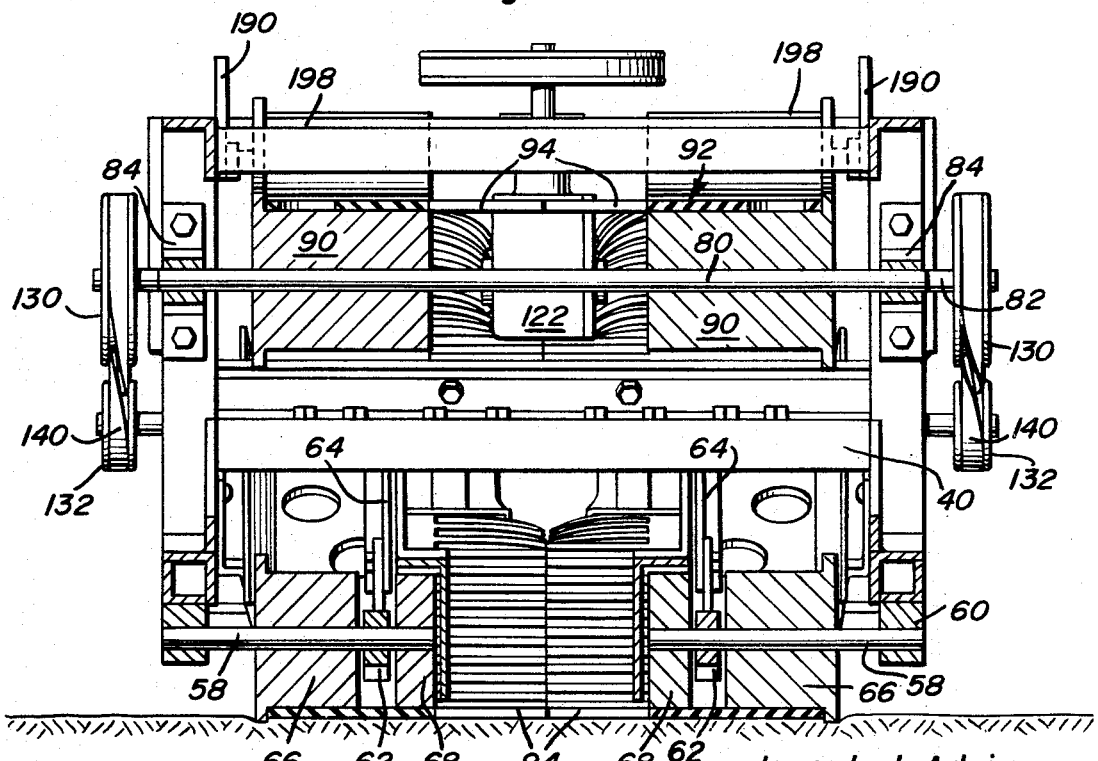
FIG. 6 is an enlarged transverse vertical sectional view taken substantially upon the plane indicated by the section line 6—6 of FIG. 3.

Referring now more specifically to the drawings, the numeral 10 generally designates the strawberry picking or harvesting machine. The machine 10 includes a main frame referred to in general by the reference numeral 12 and provided with vertically adjustable front supporting caster wheel assemblies. The rear end of the frame 12 includes a pair of rearwardly projecting opposite side extensions 16 and the rear ends of the extensions 16 are pivotally supported from the forward end of the main frame 18 of a modified drive vehicle 20 as at 22. Extensions 16 include apertures 24 through which the opposite end portions of a pivot shaft 26 are secured by means of cotter pins 28. The pivot shaft 26 is removably supported from depending opposite side portions 29 of the main frame 18 and therefore it may be seen that the rear end of the frame 12 is supported from the vehicle 20 while the front end of the frame 12 is supported from the ground 30 by means of the caster wheel asemblies 14.

The main frame 12 includes an upper portion consisting of opposite side longitudinal members 32 interconnected at their opposite ends by means of front and rear transverse members 34 and 36 and a lower portion consisting of opposite side longitudinal members 38 interconnected at their opposite ends by front and rear transverse members 40 and 42. The extensions 16 are carried by the rear ends of the longitudinal members 32 and the rear transverse member 42 is secured between the rear ends of the longitudinal members 38 and the extensions 16. Also, the frame 12 includes a pair of forward opposite side uprights 44 secured between the corresponding side members 32 and 38 and opposite side rear uprights 46 secured between the rear ends of the corresponding side members 32 and 38. An additional transverse brace 48 extends between the side members 32 and is secured to the latter at the points thereon to which the upper ends of the uprights 44 are secured. In addition, a second rear transverse member 50 is also provided rearward of the transverse member 36 and extends between the rear ends of the side members 32.

The caster wheel assemblies 14 are supported from the front transverse member 34 in depending fashion and include adjustment screw shafts 52 on which crank handles 54 are mounted whereby the wheels 56 of the caster wheel assembiles 14 may be raised and lowered relative to the front transverse member 34.

A pair of front opposite side and aligned shafts 58 have their outer ends journaled through journal brackets 60 carried by the side members 38 and their inner end portions journaled from journal blocks 62 carried by depending supports 64 having their upper ends supported from the transverse member 40. Each of the shafts 58 has a flanged belt drum mounted thereon for rotation therewith and each drum includes an outer section 66 and an inner section 68 with the sections 66 and 68 of each drum axially spaced apart to receive the corresponding journal block 62 therebetween. A second pair of shafts 70 similar to the shafts 58 have their remote ends journaled from journal brackets 72 dependingly supported from the corresponding side members 38 and similar journal brackets 74 at their inner ends supported from the transverse member 40. The shafts 70 have opposite side drums mounted thereon similar to the drums carried by the shafts 58 but which are smaller in diameter and include drum sections 76 and 78 corresponding to the drum sections 66 and 68.

A pair of front and rear upper transverse shafts 80 and 82 are journaled from journal brackets 84 and 86 carried by the upper ends of the uprights 44 and the upper ends of the side members 38, respectively, and a pair of opposite side drums 88 are mounted on the shaft 80 for rotation therewith while a pair of opposite side drums 90 are mounted on the shaft 82 for rotation therewith, the drums 88 and 90 being of one piece construction and also flanged.

An endless flexible belt referred to in general by the reference numeral 92 is entrained about the drums mounted on the shafts 58 and 70 and the drums 88 and 90 on each side of the frame 12. The belts 92 include adjacent marginal edge potions which project inwardly of the drums about which they are trained and which include integral transversely outwardly projecting fingers or finger defining portions 94. The free ends of the fingers 94 are disposed in closely spaced opposing relation and the fingers 94 may be formed merely by cutting transverse slots in the corresponding sides of the belts 92. Further, if it is desired, the fingers 94 may be reinforced with spring steel members (not shown) embedded therein and in the main body portions of the belts 92. The belts 92 are preferably constructed of rubber although it is appreciated that other materials may be found to be suitable for construction of the belts.

A prime mover referred to in general by the reference numeral 98 is supported on the main frame 18 of the drive vehicle 20 and may be drivingly connected to the rear wheels 100 of the vehicle 20 in any convenient manner (not shown). Further, the front wheels 102 of the vehicle 20 may be of any suitable steerable type and any suitable steering control (not shown) may be utilized to steer front wheels 102. Further, the vehicle 20 includes a second prime mover referred to in general by the reference numeral 104. The prime mover 104 drives an angle drive assembly 106 of any suitable type which may have gear reduction means incorporated therein and which includes a depending upright output shaft 108 having upper and lower pulleys 110 and 112 mounted thereon. The pulleys 110 and 112 are horizontally aligned with pulleys 114 and 116 mounted on shafts 118 and 120 journaled from the transverse members 36 and 50 of the frame 12. The shaft 118 comprises the input shaft for an angle drive assembly 122 provided with an output shaft comprising the shaft 82 and the shaft 120 comprises the input shaft for an angle drive assembly referred to in general by the reference numeral 124 having an output shaft 126 comprising a crankshaft. Accordingly, it may be seen that operation of the prime mover 104 will cause rotation of the transverse shaft 82 in order to drive the endless belts 92 and rotation of the crankshaft 26 for a purpose to be hereinafter more fully set forth.

The shaft 82 has a pair of pulley wheels 130 mounted on its opposite ends and the pulley wheels are drivingly connected to a pair of smaller pulley wheels 132 carried by the opposite ends of a transverse shaft 134 journaled from journal brackets 136 mounted on lower extensions 138 of the uprights 46. The pulley wheels 130 are drivingly connected to the pulley wheels 132 by means of crossed endless belts 140 and the shaft 134 has a pair of opposite side flanged drums 142 mounted thereon for rotation therewith. The frame 12 further includes a pair of opposite side depending supports 144 supported at their upper ends from the side members 38 and a pair of inwardly projecting shafts 148 are journaled from the lower ends of the supports 144 and include enlarged inner end portions 150. A transversely ribbed endless flexible belt 152 is trained about each drum 142 and the corresponding shaft 148. In this manner, rotation of the shaft 108 of the prime mover 104 will cause the belts 92 to move in clockwise directions as viewed in FIG. 3 of the drawings and the belts 152 to move in counterclockwise directions as viewed in FIG. 3 of the drawings.

The belts 92 are provided with large diameter openings 154 formed therethrough and the strawberries to be picked will tend to fall downwardly through the openings 154 and onto the upper reaches of the belts 152. A pair of upstanding U-shaped guide members 156 are supported at opposite sides of the frame 12 from the lower end portions of the side members 38 and engage the fingers 94 of the forward vertical reaches of the belts 92 to fold the fingers 94 rearwardly relative to the direction of movement of the belts 92 thereby to define a throat area 158 between the forward ends of the belts 92 adjacent the ground 30. Thus, a row of strawberry plants 160 along which the frame 12 is being advanced is received between the caster wheel assemblies 56 and the lower forward portions of the belts 92. The U-shaped guides 156 extend downwardly to a point closely adjacent the ground 30 and when the fingers 94 of the belts 92 move out of the lower end of the guides 156 they are free to spring back toward their straight positions. Of course, at this time, the fingers are spaced closely adjacent the ground in order that they may swing horizontally toward their straight positions beneath the foliage of the plants 160.

The forward end of the frame 12 includes a pair of opposite side rearwardly curved bush gathering guides or members 162 and the members 162 tend to slide beneath the foliage of the plants 160 to elevate the same and deflect it inwardly toward the center of the row prior to the fingers 94 of the belts 92 being released from the lower ends of the guides 156 for swinging beneath the foliage.

A pair of opposite side brackets 164 are supported from the side members 38 and have mounted thereon guide assemblies 166 disposed beneath and extending along the root ends of the fingers 94 in the lower rearwardly and upwardly inclined reaches of the belts 92. The guides 166 include cam members 168 which are reciprocal longitudinally of the guides 166 and follower members or plates engaged with the cam members 168 which are spring mounted on the guides 166 by means of springs 172 and which are reciprocated transversely of the rectilinear movement of the cam members 168 upon their reciprocation. A pair of adjustable length connecting rods 174 have one set of corresponding ends journaled on the opposite ends of the crankshaft 126 and the other set of corresponding ends of the connecting rods 174 are pivotally connected to the cam members 168 as at 176. From FIG. 7 of the drawings it may be seen that the follower members 170 are reciprocal in upwardly inclined directions to upwardly deflect the root ends of the fingers 94 and that the guides 166 define channels in which the follower members 170 are reciprocal. The guides 166 include opposite end pairs of opposite side slots 180 in which the opposite end portions of transverse pins 182 carried by the follower members 70 are reciprocal and therefore the follower members 70 are retained against movement in directions paralleling the paths along which the cam members 168 are reciprocal.

The frame 12 further includes elongated fence boards 184 supported from the side members 38 which closely overlie the remote edge portions of the rearwardly and upwardly inclined reaches of the belts 92 and a second pair of U-shaped guides 186 are supported from the side members 38 and serve to rearwardly and inwardly deflect the fingers 94 of the belts 92 as the fingers 94 approach the upper end of the reawardly and upwardly inclined reaches of the belts 92.

The opposite side members 32 have a pair of sector plates 190 pivotally mounted thereon as at 192 and each sector plate 190 includes an arcuate slot 194 through which a headed fastener 196 secured to the corresponding side member 132 is received. Each sector plate 190 has a flanged tensioning roller 198 journaled therefrom and the tensioning rollers 198 are provided to adjustably tension the belts 92. The second pair of U-shaped guides 186 are supported from brackets 200 and 202 carried by supplemental transverse members 204 and 206 secured between the side members 38 and the opposite side fences or boards 184 are supported from suitable brackets 208 adjustably supported from the side members 38 by means of fasteners 210.

In operation, the harvester or machine 10 is advanced along a row of strawberry plants 160 by the drive vehicle 20. The foilage of the strawberry plants 160 is engaged and lifted by the bush gathering members 162 before the foliage is received between the lower portions of the forward upstanding reaches of the belts 92. Of course, the fingers 94 of the belts 92 are folded rearwardly relative to the direction of movement of the belts 92 in the lower regions of the forward upstanding reaches and thus the plants 160 are received between the forward ends of the reaches extending between the rollers carried on the shafts 58 and 70. While the foliage of the plants 160 is elevated, the fingers 94 of the belts 92 move outwardly of the lower ends of the guides 156 and are thus allowed to swing horizontally toward each other beneath the foliage of the plants 160. Then, inasmuch as the rearwardly and upwardly inclined reaches of the belts 92 move rearward relative to the frame 12 at a speed substantially equal to the forward speed of the frame 12 over the ground 30, the fingers 94 move upwardly through the foliage of the plants 160 and pick the berries from the plants. As the fingers 94 move upwardly through the plants, they are vibrated at their base or root ends in the manner illustrated in FIG. 7 of the drawings by the follower members 170. This vibration of the fingers 94 assists in the latter picking the berries from the plants 160 and the berries are urged toward the remote sides of the belts 92 by the vibrating fingers 94 and thus are caused to move toward the areas of the belts 92 having the openings 154 formed therein. The openings 154 are staggered transversely of the belts 92 whereby any berries rolling down the rearwardly and upwardly inclined reaches of the belts 92 will fall through the openings 154 and onto the upper rearwardly and upwardly moving reach of the belt 152. Of course, the transverse ribs on the belt 152 will prevent the berries from moving downwardly along the upper reach and the berries will therefore be discharged from the rear end of the upper reach of the belt 152 for dropping into any suitable receptacle (not shown) for receiving the berries. Also, vertically short fences 220 are supported from the frame 12 in any convenient manner along the remote edge portions of the upper reaches of the belts 152 to prevent the berries from rolling off.

The members 162 may be adjusted relative to the ground 30 by the adjustable caster wheel assemblies 14 and little effort is required to govern the speed of the prime movers 98 and 104 such that the lower rearwardly and upwardly inclined reaches of the belts 92 will move rearwardly relative to the frame 12 at a speed generally equal to the forward movement of the frame 12 over the ground 30.

It is to be appreciated that the machine 10 can be readily developed into a multiple row harvester for simultaneously harvesting strawberries from three or four rows of plants. Strawberry plants may be planted in what is called the "hill system" in which rows of plants are formed spaced one foot apart in groups of three or four rows with the groups of rows spaced two feet apart. With strawberry plants arranged in this manner, the operator of a single harvester constructed in accordance with the present invention will be able to pick three or four times the amount of berries. A large platform type vehicle may be used with additional main conveyors leading to it in order to contain the picked berries until it is desired to unload or additional help on the platform will be able to grade or package the berries. Additionally, the harvester 10 may also be developed to be used in conjunction with strawberry plants arranged in the "matted row system" in which rows are planted three and one half or four feet apart and allowed to spread out to 18 or 24 inches in width. If the "matted row system" is utilized, the belts 92 may be replaced by V-belts having fingers attached thereto and spaced apart approximately one and one half inches for the picked berries to drop through between the V-belts and onto a higher speed conveyor in lieu of the belts 152. Of course, such V-belts would not have the equivalent of the openings 154 and the spacing between the V-belts will replace the openings 154. This will allow narrower spacing of the picker strips and the possibility of forcing the plants into the strips.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A harvesting machine having front and rear ends and including a support frame adapted to be supported from and to move forwardly over the ground, an elongated inclined picker member extending in a direction generally paralleling the direction of intended movement of said machine, downwardly inclined at its forward end, and including generally horizontally laterally outwardly projecting fingers spaced along one side thereof, said picker member being supported from said frame for longitudinal upward and rearward shifting of said picker member relative to said frame at a speed generally equal to the forward speed of said frame whereby said fingers are raised relative to the ground substantially independent of horizontal displacement relative to the ground during forward movement of said frame over the ground and upward and rearward shifting of said picker member relative to said frame, said elongated inclined picker member comprising a generally straight reach of an endless flexible member entrained from said frame, said endless flexible member comprising a belt from one longitudinal edge portion of which said fingers project.

2. The combination of claim 1 wherein said fingers are constructed of resilient material and are sufficiently stiff in nature to support themselves in substantially horizontal position.

3. The combination of claim 2 wherein said fingers are formed integrally with said belt and are defined by transverse cuts formed in said one longitudinal edge portion thereof.

4. The combination of claim 3 wherein said machine includes means supported from said frame operative to intermittently upwardly deflect said fingers toward upward and outwardly inclined positions and subsequently release said fingers for return toward generally horizontally disposed positions.

5. A harvesting machine having front and rear ends and including a support frame adapted to be supported from and to move forwardly over the ground, an elongated inclined picker member extending in a direction generally paralleling the direction of intended movement of said machine, downwardly inclined at its forward end, and including generally horizontally laterally outwardly projecting fingers spaced along one side thereof, said picker member being supported from said frame for longitudinal upward and rearward shifting of said picker member relative to said frame at a speed generally equal to the forward speed of said frame whereby said fingers are raised relative to the ground substantially independent of horizontal displacement relative to the ground during forward movement of said frame over the ground and upward and rearward shifting of said picker member relative to said frame, said fingers being supported from said picker member for angular displacement about axes adjacent their base ends and extending along said one side of said picker member between first positions with said fingers generally horizontally disposed and second positions with said fingers upwardly and outwardly inclined, and means supported from said frame operative to intermittently shift said fingers between said first and second positions.

6. The combination of claim 5 wherein said elongated inclined picker member comprises a generally straight reach of an endless flexible member entrained from said frame.

7. The combination of claim 6 wherein said endless flexible member comprises a belt from one longitudinal edge portion of which said fingers project.

8. The combination of claim 5 wherein said fingers are constructed of resilient material.

9. In combination with a support frame movable horizontally forwardly over the ground along a row of plants, a pair of forwardly disposed lower front and rear guide means carried by said frame, an endless flexible member entrained from said frame and including a forwardly disposed upstanding and downwardly moving reach whose lower end is guidingly engaged with said front guide means and terminates in a short rearwardly moving generally horizontal reach extending rearwardly toward said rear guide means, said flexible member being guidingly engaged with said rear guide means at the rear end of said horizontal reach and the latter terminating in an upwardly and rearwardly inclined reach, said flexible member including longitudinally spaced laterally outwardly projecting fingers along one side thereof, third guide means carried by said frame above said first guide means and engaged with at least the lower portion of said upstanding reach to fold said fingers inwardly and rearwardly in relation to the direction of movement of said upstanding reach, said third guide means being operative to retain said fingers in folded positions until they at least approach the lower limit of movement of said upstanding reach and then to release said fingers at least by the time they are disposed in the forward position of said horizontal reach, whereby said fingers are released for swinging under the foliage of row crops along which said frame and upstanding reach are being advanced.

10. The combination of claim 9 including means drivingly connected to and operative to drive said flexible member at a linear speed generally equal to the linear speed of forward movement of said frame.

11. The combination of claim 9 wherein said fingers include outer end portions swingable in upstanding planes relative to said flexible member carried by said frame operative to oscillate at least the free end portions of said fingers in said upstanding planes from their base ends.

12. The combination of claim 11 wherein said fingers are constructed of resilient material and are sufficiently stiff in nature to support themselves in substantially horizontal position.

13. The combination of claim 12 wherein said fingers are formed integrally with said belt and are defined by transverse cuts formed in said one longitudinal edge portion thereof.

14. A mobile frame, an elongated picker member supported from said frame with said elongated picker member generally paralleling the direction of intended movement of the frame, said picker member including generally horizontally, laterally outwardly projecting fingers spaced along one side thereof and being supported from said frame for upward shifting relative to said frame, said fingers being supported from said picker member for angular displacement about axes adjacent the base ends and extending along said one side of said picker member between first positions with said fingers generally horizontally disposed and second positions with said fingers upwardly and outwardly inclined, and means supported from said frame operative to intermittently shift said fingers between said first and second positions during upward movement of said picker member relative to said frame.

15. The combination, a mobile frame, an elongated endless flexible member supported from said frame for guided longitudinal movement relative thereto and including an upstanding forward descending reach terminating downwardly in a rearwardly and upwardly inclined ascending reach, said flexible member including horizontally laterally outwardly projecting fingers spaced along one side thereof, said frame including guide means operative to be engaged with at least the lower portion of said upstanding reach to fold said fingers inwardly and rearwardly in relation to the direction of movement of said upstanding reach and retain said fingers in folded positions until they at least approach the lower limit of movement of said upstanding reach and then to release said fingers at least by the time they are disposed in the forward position of said rearwardly and upwardly inclined reach, whereby said fingers are released for swinging under the foliage of row crops along which said frame and upstanding reach are being advanced.

References Cited

UNITED STATES PATENTS

| 2,641,891 | 6/1953 | Spears et al. | 56—35 |
| 2,830,425 | 4/1958 | Stansfield | 56—35 |
| 3,365,869 | 1/1968 | Whiteley | 56—327 |
| 3,389,542 | 6/1968 | Rasmussen | 56—331 |

RUSSELL R. KINSEY, Primary Examiner